United States Patent
Scheu

(10) Patent No.: US 8,489,263 B2
(45) Date of Patent: Jul. 16, 2013

(54) INFORMATION DEVICE FOR A VEHICLE

(75) Inventor: Michael Scheu, Ditzingen (DE)

(73) Assignee: Dr. Ing. H.C.F. Porsche Aktiengesellschaft (DE)

( * ) Notice: Subject to any disclaimer, the term of this patent is extended or adjusted under 35 U.S.C. 154(b) by 475 days.

(21) Appl. No.: 12/700,811

(22) Filed: Feb. 5, 2010

(65) Prior Publication Data

US 2010/0228414 A1 Sep. 9, 2010

(30) Foreign Application Priority Data

Mar. 6, 2009 (DE) .......................... 10 2009 012 061

(51) Int. Cl.
*G06F 17/00* (2006.01)

(52) U.S. Cl.
USPC .................. 701/22; 701/23; 701/24; 701/28; 701/41; 701/301; 340/426.28; 340/431; 340/438; 340/539.1; 340/902; 307/9.1; 307/10.1; 180/168; 180/272; 318/587; 342/44

(58) Field of Classification Search
USPC ............. 701/22, 23, 24, 28, 41, 96, 117, 118, 701/301; 340/5.72, 426.28, 431, 436, 438, 340/539.1, 902, 903, 905, 928, 948; 307/9.1, 307/10.1; 180/168, 272; 235/384; 318/587; 705/13; 704/270; 342/44; 455/523
See application file for complete search history.

(56) References Cited

U.S. PATENT DOCUMENTS

| | | | | |
|---|---|---|---|---|
| 5,462,439 A * | 10/1995 | Keith | ............................. | 320/109 |
| 5,696,367 A * | 12/1997 | Keith | ............................. | 235/381 |
| 7,801,651 B2 * | 9/2010 | Iwers | ............................... | 701/21 |
| 8,025,118 B2 * | 9/2011 | Scheucher | .................... | 180/68.5 |
| 2005/0228553 A1 * | 10/2005 | Tryon | ............................. | 701/22 |
| 2006/0289213 A1 * | 12/2006 | Cervantes | .................... | 180/65.3 |
| 2010/0225475 A1 * | 9/2010 | Karch et al. | .................... | 340/540 |
| 2012/0296794 A1 * | 11/2012 | Boot et al. | ....................... | 705/37 |

FOREIGN PATENT DOCUMENTS

| | | |
|---|---|---|
| DE | 31 42 038 | 5/1983 |
| DE | 44 22 005 | 12/1995 |
| DE | 20 2005 018 942 | 3/2006 |
| EP | 0 481 743 | 4/1992 |

* cited by examiner

*Primary Examiner* — McDieunel Marc
(74) *Attorney, Agent, or Firm* — Gerald E. Hespos; Michael J. Porco; Matthew T. Hespos

(57) ABSTRACT

A vehicle has an apparatus (2) for charging an electrical energy store (3) from a stationary power supply system. An existing controller (6) of the vehicle is configured to calculate and indicate an amount of electrical energy drawn from the stationary power supply system by using a time information item provided in the vehicle controller (6). Alternatively, a battery management system (1) is configured to calculate and indicate the amount of electrical energy drawn from the stationary power supply system by using the time information item provided in the existing vehicle controller (6).

20 Claims, 1 Drawing Sheet

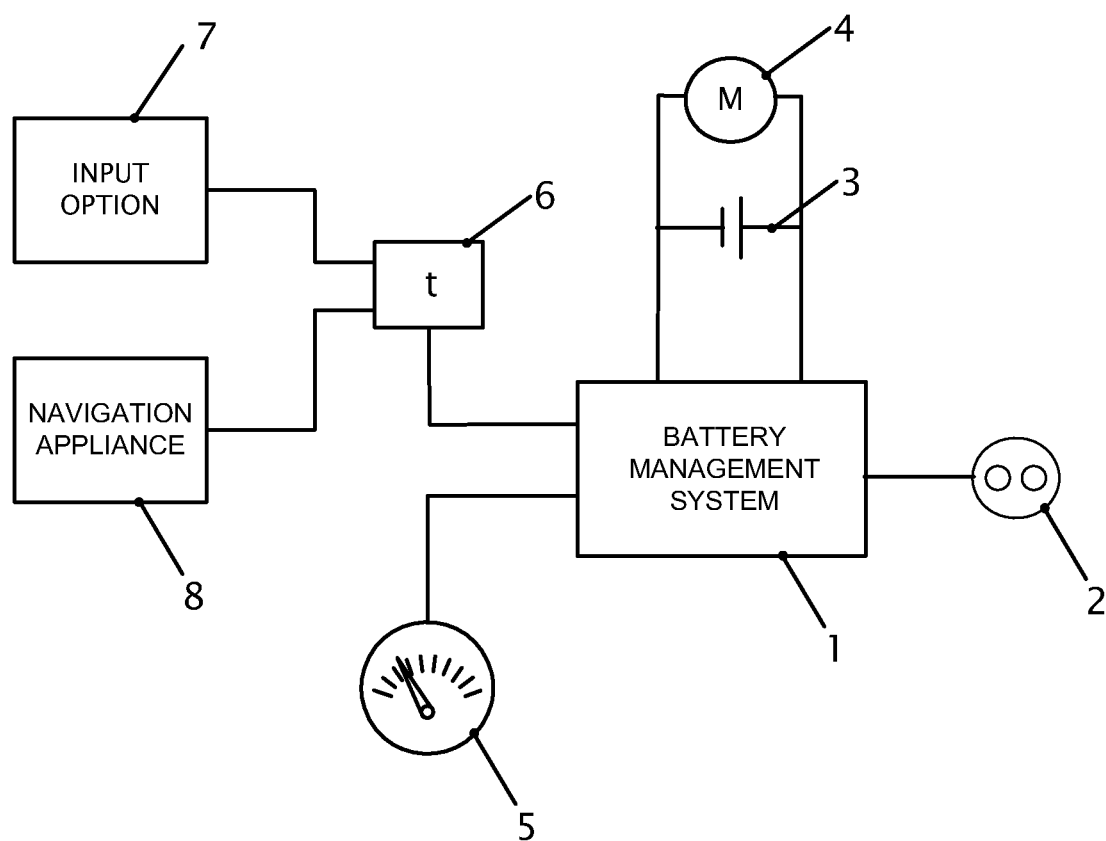

INFORMATION DEVICE FOR A VEHICLE

CROSS-REFERENCE TO RELATED APPLICATIONS

This application claims priority under 35 USC 119 to German Patent Application No. 10 2009 012 061.0 filed on Mar. 6, 2009, the entire disclosure of which is incorporated herein by reference.

BACKGROUND OF THE INVENTION

1. Field of the Invention

The invention relates to an information device for a vehicle.

2. Description of the Related Art

DE 20 2005 018 942 U1 discloses an on-board computer for electric vehicles that has a microprocessor with an integrated AD converter (for converting an analogue input signal into digital values) and also multiplexers (combinational selection circuit). This on-board computer is used to determine the extractable capacity of the vehicle storage battery, which is of course dependent on the discharge cycle, i.e., on discharge current, final discharge voltage and charge state. The exact determination of the extractable capacity allows better estimation of the remaining range of the electric vehicle.

The object of the invention is to improve the information device of the type in question and to make the information device more informative for the driver of the vehicle.

SUMMARY OF THE INVENTION

The invention relates to a vehicle with an apparatus for charging its electrical energy store from a stationary power supply system. The vehicle also has an information device configured to calculate and indicate an amount of electrical energy drawn from the stationary power supply network by using a time information item provided in a vehicle controller. By combining the electrical variables current, voltage and charge with the time information item, it is possible to better inform the driver about the charging of the electrical energy store. This is because when electrical energy is drawn from the stationary power supply system, the billing usually is effected by taking account of the extracted amount of energy, for example, measured in kilowatt hours. However, calculation of this electrical variable requires a time information item. The time information item is provided without additional complexity by using the time information item from a controller that is already present in the vehicle. Thus, information about the amount of electrical energy is provided to the driver of the vehicle without additional hardware complexity. This information is calculated using an available controller or a battery management system (BMS), for example, which usually have adequate computation capacity.

The vehicle preferably is a hybrid or electric vehicle and the electrical energy store is a storage battery, such as a lithium-ion or nickel-metal-hydride storage battery. Hybrid or electric vehicles have a powerful electrical energy store whose charging requires relatively large amounts of energy and a relatively long period of time. Accordingly, provision may be made for the hybrid or electric vehicle to be charged on the stationary power supply system ('plug-in' vehicle). The information device of the invention, therefore, is particularly informative for the driver in view of the amount of electrical power or period of time required.

In a first, preferred embodiment of the invention, the vehicle controller is a central cockpit controller. Such a gateway centrally controls the functions of connected control and indicator elements. In particular, the gateway has a time information item, for example, for showing a time of day in downstream indicator or output devices for the driver. Thus, calculation of the amount of energy does not require any additional hardware.

In an alternate embodiment, the vehicle controller is a combi instrument. A particularly simple implementation of the information device is obtained by accessing the time information item that is already available in the combi instrument, for example, for showing the current time of day.

In a further embodiment, the vehicle controller is an on-board computer. Such an on-board computer usually provides a time information item already that can be used without additional hardware complexity.

An input option preferably is provided for power costs, thereby enabling the information device to be made particularly informative for the driver. This optional configuration enables the costs incurred to be indicated as an alternative or in addition to the amount of electrical energy drawn from the stationary power supply system. In this case, provision may be made for the power costs to be input manually, for example, as a price for one kilowatt hour. For this purpose, an on-board computer usually is provided already with an appropriate numerical keypad intended, for example, to input telephone numbers. However, this same numeric keypad can be used for inputting power cost data that can be used by the information device.

Particular convenience is obtained as a result of automated input of the power costs. For example, a wireless communication link intended, for example, GSM or UMTS to set up an Internet connection to an appropriate computer (server), may be employed for retrieving power costs.

Individual customization of the information device can be achieved by virtue of an input option for maximum power costs. For example, the additional or alternative ability to prescribe a maximum value for the power costs per kilowatt hour and/or a maximum value for the power costs of an amount of power drawn from the stationary power supply system overall allows the charging of the electrical energy store to be matched individually to the requirements of the driver. Further refinements, such as a preference for green power, are likewise possible. Furthermore, it is alternatively or additionally possible for further control/indication options to be provided, such as voice control and/or voice output.

The invention is now illustrated in more detail with reference to a drawing, in which the single FIGURE shows a particularly preferred embodiment of the invention.

BRIEF DESCRIPTION OF THE DRAWING

The FIGURE is a schematic illustration of an information device in accordance with a preferred embodiment of the invention.

DETAILED DESCRIPTION OF THE PREFERRED EMBODIMENT

It should be understood that the elements shown in the FIGURE may be implemented in various forms of hardware, software or combinations thereof. Preferably, these elements are implemented in a combination of hardware and software on one or more appropriately programmed general-purpose devices, which may include a processor, memory and input/output interfaces.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

A hybrid or electric vehicle (not shown) comprises an electrical energy store 3 that preferably is in the form of a lithium-ion or nickel-metal-hydride storage battery. The electrical energy store 3 is connected electrically to an electric motor 4. The electric motor 4 can drive the hybrid or electric vehicle when the electrical motor 4 is supplied with electric power from the electrical energy store 3. A battery management system 1 or generally an energy management system (hybrid manager or electric vehicle manager) is provided for monitoring the electrical energy store 3. The battery management system 1 controls the supply of electric power to the electric motor 4 from the electrical energy store 3, monitors temperatures, etc. An indicator device 5 is provided to inform the driver of the hybrid or electric vehicle. The indicator device 5 shows the values of various electrical variables for current, voltage and charge of the electrical energy store, for example, in analogue or digital form.

The hybrid or electric vehicle has a connection apparatus 2 that is connectable to a stationary power supply system for charging the electrical energy store 3. The connection apparatus 2 can be used to draw electric power, for example, single-phase AC voltage at 230 V or three-phase AC at a voltage of 400 V, from the lower-voltage system to charge the electrical energy store 3. To this end, the means of connection apparatus 2 may be in the form of a socket for receiving a charging cable. The connection apparatus 2 can take other forms and may be configured to provide for contactless (e.g., inductive) charging of the electrical energy store 3. The charging likewise is controlled by the battery management system 1.

The battery management system 1 measures or calculates the electrical variables current, voltage and charge when electrical energy is drawn from the stationary power supply system. In addition, provision is made for using a time information item from a vehicle controller 6. For example, the vehicle controller 6 may be in the form of a combi instrument or in the form of an on-board computer or in the form of a gateway. The connection of the vehicle controller 6 to the battery management system 1, for example, by means of CAN, allows a time information item to be combined with the electrical variables current, voltage and charge. This allows calculation of a value for the amount of electrical energy drawn from the stationary power supply system, for example, in kilowatt hours. In this case, the calculation can be performed in the vehicle controller 6 or in the battery management system 1.

Hence, a value is calculated for the amount of electrical energy drawn from the stationary power supply system during a time period, for example, within the last 24 hours, and is indicated or output to the driver.

Furthermore, an input option 7 preferably is provided for power costs, thereby enabling the information device to be made particularly informative for the driver. This optional configuration enables the costs incurred to be indicated as an alternative or in addition to the amount of electrical energy drawn from the stationary power supply system.

In addition, the amount of electrical energy or corresponding power costs for a journey that already has been made or that is planned can be calculated by linking to a navigation appliance 8, where the navigation appliance measures or plans a journey by the vehicle.

Although the disclosure herein has been described with reference to particular illustrative embodiments, it is to be understood that these embodiments are merely illustrative of the principles and applications of the present disclosure. Therefore numerous modifications may be made to the illustrative embodiments and other arrangements may be devised without departing from the spirit and scope of the present disclosure, which is defined by the appended claims.

What is claimed is:

1. An information device for a vehicle that has an electrical energy store in the vehicle and an apparatus for charging the electrical energy store with electrical energy drawn from a stationary power supply system external of the vehicle, the information device comprising:
    a battery management system for processing and indicating values for electrical variables that include current, voltage and charge when the electrical energy is drawn from the stationary power supply system; and
    a vehicle controller in the vehicle to calculate and indicate an amount of electrical energy drawn from the stationary power supply system by using a time information item provided in a vehicle controller.

2. The indicator device of claim 1, wherein the vehicle is a hybrid or electric vehicle and the electrical energy store is a lithium-ion or nickel-metal-hydride storage battery.

3. The indicator device of claim 2, wherein the vehicle controller is a central cockpit controller/gateway.

4. The indicator device of claim 2, wherein the vehicle controller is a combi instrument.

5. The indicator device of claim 2, wherein the vehicle controller is an on-board computer.

6. The indicator device of claim 1, wherein the vehicle has an input option for inputting cost data for the electrical energy drawn from the stationary power supply system, and wherein the information device is configured to calculate and indicate a cost of the electrical energy drawn from the stationary power supply system.

7. The indicator device of claim 6, wherein the input option comprises a numerical keypad or voice input.

8. The indicator device of claim 6, wherein the input option comprises a wireless communication link.

9. The indicator device of claim 6, wherein the vehicle has a navigation appliance for measuring or planning a journey by the vehicle, and wherein the information device is configured to calculate and indicate corresponding power costs for a journey that already has been made or that is planned.

10. A method for calculating and indicating by a processor an amount of electrical energy drawn by a vehicle with an electrical energy store from a stationary power supply system external of the vehicle, the method comprising:
   connecting an apparatus on the vehicle to the stationary power supply system external of the vehicle for drawing electrical energy from the stationary power supply system and charging the electrical energy store of the vehicle; and
   using a time information item provided in a vehicle controller of the vehicle for calculating and indicating by the processor an amount of electrical energy drawn from the stationary power supply system while charging the electrical energy store.

11. The method of claim 10, further comprising inputting cost data for electrical energy drawn from the stationary power supply system and calculating energy costs.

12. The method of claim 11, further comprising using a navigation appliance of the vehicle for calculating a cost of a trip stored on the navigation appliance based on the step of calculating the cost of the electrical energy drawn from the stationary power supply system.

13. The method of claim 11, wherein the step of inputting cost data comprises using a numerical keypad or a voice input.

14. The method of claim 11, wherein the step of inputting cost data comprises using a wireless communication link.

15. The method of claim 11, wherein an input option is provided for providing maximum power costs.

16. A hybrid or electric vehicle comprising:
   an electric motor for powering or contributing to powering the vehicle;
   an electrical energy store connected to the electric motor for providing electric power to the electric motor;
   a connection apparatus connected to the electrical energy store and selectively connectable to a stationary power supply system external of the vehicle for drawing electrical energy from the stationary power supply system and charging the electrical energy store;
   a battery management system for processing and indicating values for electrical variables that include current, voltage and charge when electrical energy is drawn from the stationary power supply system;
   a vehicle controller for controlling or monitoring at least one of the electric motor and the electrical energy store, the vehicle controller including a time information item; and
   an information device configured to calculate and indicate an amount of electrical energy drawn from the stationary power supply system by using the time information item provided in vehicle controller.

17. The hybrid or electric vehicle of claim 16, further comprising an input option for inputting cost data for the electrical energy drawn from the stationary power supply system, wherein the information device is configured to calculate and indicate a cost of the electrical energy drawn from the stationary power supply system.

18. The hybrid or electric vehicle of claim 17, wherein the input option comprises a numerical keypad or voice input.

19. The hybrid or electric vehicle of claim 17, wherein the input option comprises a wireless communication link.

20. The hybrid or electric vehicle of claim 17, further comprising a navigation appliance for measuring or planning a journey by the vehicle, where the information device is configured to calculate and indicate corresponding power costs for a journey that already has been made or that is planned.

* * * * *